Patented Nov. 11, 1941

2,262,668

UNITED STATES PATENT OFFICE 2,262,668

MOLDABLE COMPOSITION

Rupert S. Daniels, Newark, N. J., assignor, by mesne assignments, to Union Carbide and Carbon Corporation, New York, N. Y., a corporation of New York No Drawing. Application July 26, 1928,
Serial No. 295,623

4 Claims. (Cl. 51—298)

This invention relates to compositions comprising a filler, either granular or fibrous, and a bonding agent therefor, and more particularly to compositions having a phenolic resinoid product as a bonding agent and an abrasive granular material, as a filler for the production of grinding wheels, and other abrasive implements.

It has long been recognized that the phenolic resinoid products have properties which render them superior to glue and similar bonding agents for granular materials, such as carborundum, emery, etc., in that they are fusible and soluble while in the potentially reactive stage, but can be hardened or advanced by heat to a stage wherein they are infusible, insoluble and resistant to oil and most chemicals; and a Patent 942,808 for such a use was granted to L. H. Baekeland on December 7, 1909. The disclosures of Patents 1,503,392 granted July 29, 1924, to Turkington, and 1,537,454 of May 12, 1925, to Brock pointed out the solvent and chemical actions of furfural on a potentially reactive phenol-formaldehyde resinoid and its suitability for the cold molding of grinding wheels and the like, whereby their manufacture is simplified.

However, mixtures prepared with furfural or an equivalent aldehyde are apt to be unsatisfactory, particularly when coarse grit is used as a filler and a resinoid content of ten per cent or over to give strength is required. Under such conditions the proportion of furfural that necessarily must be added to bind the resinoid to the grit is such that the mixture usually becomes sticky or lumpy and may affect the balance of a wheel molded therefrom; or the mixture after molding becomes distorted or warped during a subsequent baking operation and may show signs of blistering; or the molded wheel after baking lacks transverse strength on account of the presence of excess solvent. When the resinoid content is further increased to about 17 per cent or more, it is found that these defects may occur when a grit as fine as No. 80 is used.

I have found that defects of the character above enumerated can be avoided when coarse grit or finer grit with increased resinoid content is used, by coating the grit particles with a potentially reactive resinoid (that is, a resin-like product which is soluble and fusible, but hardenable by heat to an insoluble, infusible form) in liquid or dispersed form and of such a character that there is to a marked degree a colloidal dispersion of the resinoid constituent in a liquid medium. In other words, the resinoid content is brought to a condition or so modified that its sticky characteristic is largely eliminated and the formation of lumps or sticky masses, when mixed with abrasive grains, is thereby substantially avoided. Such resinoid suspension in liquid form can be obtained in various ways as for example, by partially reacting or advancing a potentially reactive resinoid by the application of heat while in the presence of a liquid vehicle to cause or increase the colloidal dispersion of the resinoid therein to such a point that the combination of resinoid and liquid forms with the abrasive grains a moldable mass that is characterized by relative non-stickiness or friability, or it can be obtained by selecting a resinoid of the one-step type which has not been separated from its liquid by-products to such an extent as to lose its liquid or flowing properties and which is partially advanced therein to yield the desired degree of colloidal dispersion. Varnishes containing the complex phenolic body derived from the reaction of a phenol and a fatty oil and thereupon combined with a hardening agent and suitable solvents as described in a patent to Byck 1,590,079 granted June 22, 1926, or similar varnishes of an airdrying type in which a blending agent of non-phenolic resinous nature is added as disclosed in a Patent 1,677,417 to Turkington, granted July 17, 1928, are suitable for the purposes of this invention, for they exhibit that property characteristic of the colloidally dispersed resinoids as defined herein.

The total resinoid content of the composition can be added as varnish or liquid of the character indicated to the grit or other filler. It is found preferable, however, to supply only a portion of the resinoid binder as varnish, that is, just enough to form a continuous film about the particles of filler, and to add the balance of the resinoid required in a solid pulverized condition to the coated filler whereby a modification or elimination of the undesirable sticky property is secured. The added resinoid binder may be of the same character as that contained in the varnish or of a different nature. For example, the powdered resinoid added to grit coated with the air drying varnish mentioned above, can be the usual phenol-formaldehyde product in the potentially reactive condition or can be partially advanced toward the insoluble stage, or it may be a glycerol-phthalic anhydride or other known type of resinoid suitable for this purpose.

In the manufacture of grinding wheels the abrasive grains of carbon silicide or other suitable material are thoroughly mixed with the varnish or liquid by charging a kneading machine, a ball mill, or other mixing machine with the grains and then adding the varnish or solution prior to or while the grains are stirred; the agitation is continued until the grains are substantially covered with films of the liquid. The volatile content of the film can be partially or substantially removed when found necessary, either by heating the mixture while it is in the mixer or after loading in shallow pans, which are then inserted in a heated drier. When the desired condition of dryness is reached, powdered resinous material can be added to the coated grains and admixed therewith, either in a kneading machine, a ball mill or other suitable mixer.

The varnish used can have a varying resinous content; for example, with grit of a size known commercially as #46 grit, a varnish containing 67% of resinoid gives a satisfactorily applied film. With larger grit a thinner solution may be desirable to secure increased flow, particularly if the percentage weight of resinoid to grit remains the same. Varying proportions of varnish to grit may be used, but about 6% by weight of a varnish containing 67% of resinoid, i. e., solids, is found to coat sufficiently a grit of the #46 size. To the varnished or coated grit enough of the powdered resinoid is added so that the total resinoid content of the mass is from about twelve to twenty-five per cent by weight. When both the varnish and the powdered resinoid are used, it is desirable that the resinoid content in the varnish does not exceed 30% and preferably is about 20% of the total resinoid; so proportioned, better working qualities are present in the composition and the molded articles are found in practice to have an increased transverse strength.

The composition of abrasive varnish and resinoid obtained is suitable for cold molding to produce articles that are readily discharged and sufficiently coherent to withstand handling when molding pressures common in standard practice, or in the neighborhood of 1500 pounds to the square inch, are used. The cold molded articles as discharged from the mold are placed in an oven and baked at 85 to 200° C. for 1 to 50 hours or more, depending largely upon the proportions of varnish and resinoid used and the thickness of the molded articles. The baking procedure found most satisfactory is for an extended period at a relatively low temperature until the solvent content is substantially evaporated and a gradual rise to a higher temperature followed by a further extended period at the higher temperature. Articles prepared in this manner, even though the resin content may be high, show no signs of blistering, warping or cracking and do not have resinous surfaces.

The following examples illustrate specific applications of this invention, but it is to be understood that the invention is not restricted thereto.

*Example 1.*—343 gms. of #46 grit are coated with 20 gms. of an airdrying varnish containing 67% of phenolic resinoid and with this is admixed about 35 gms. of powdered potentially reactive phenol formaldehyde resinoid. The composition is cold molded into pieces one half inch thick under 1500 pounds' pressure and the molded pieces baked at 85° C. for 16 hours, after which the temperature is gradually raised to 135° C. during the next 8 hours and maintained at this temperature for about 45 hours. A 1" x 3" test piece so molded and baked had a transverse strength in the neighborhood of 5000 pounds and over to the square inch.

*Example 2.*—The same ingredients and the same molding conditions as above are used except the proportions are 240 gms. of grit, 14 grams of air-drying varnish and about 51 grams of phenolic resinoid. After molding the pieces are baked for 16 hours at 85° C. and the temperature gradually raised to 165° C. during the next 8 hours. Test pieces made of the composition and so treated have shown a transverse strength in the neighborhood of 4000 pounds per square inch and over, though made of compositions standing for 1 or 2 days before molding.

*Example 3.*—360 gms. of a #12 grit are mixed with 20 gms. of a 60% resinoid solution in furfural. When thoroughly mixed, 48 gms. of a powdered potentially reactive resinoid of the phenol-formaldehyde type is added and after thorough mixing the mixture is sieved through a #8 screen and thereafter molded under pressure of 2000 to 3000 pounds per square inch. The molded pieces are baked for about 16 hours at 85° C. and then the temperature is raised to about 165° C. over a period of about 8 hours. Tests show the average transverse strength of pieces so molded to be over 2500 pounds per square inch and the pieces show a uniform density.

By the process herein disclosed, it is possible to produce a mixture or composition of very low resinoid content which will mold into a satisfactory article, for the varnish spreads as a film about the grit. When the powdered resinoid is thereafter added, a dense article is possible, the density depending upon the amount of resinoid added. Mixtures made with varnish have the added advantage that bonded articles can be produced by troweling the mixture in molds and baking the articles after removal from the molds; grinding wheels so molded and baked have an open porous structure which adapts them for free cutting uses. As compared with an article molded with a resinoid in accordance with prior practice, it is found that articles molded from the composition and by the process of this invention, have a materially higher transverse strength for the same resinous content.

I claim:

1. An abrasive molding composition comprising discrete abrasive granules having a sticky inner coating of a phenol-oil resinous composition and an outer coating of powdered fusible heat-hardenable synthetic resin of sufficient thickness to prevent cohesion of the granules in the absence of substantial external pressure while enabling them to cohere firmly when subjected to cold molding pressure.

2. Process of preparing a composition of abrasive granules comprising film coating the abrasive granules with a viscous advanced heat-hardenable synthetic resinous varnish including a phenol oil resinous composition thinned to a film coating viscosity with organic solvent, mixing the so-coated abrasive granules with powdered fusible heat-hardenable synthetic resin until the liquid coated abrasive granules have absorbed a sufficient outer coating of the powder to prevent them from sticking together in the absence of substantial external pressure while enabling them to cohere firmly when subjected to cold molding pressure.

3. Moldable and heat-hardenable abrasive mixture comprising abrasive grains coated with liquid coating comprising principally the reaction product of a phenol, an oil, and a methylene-containing agent and super-coated with a finely divided solid reactive resin of a heat-hardenable character, providing a loose granular mixture capable of being compressed into coherent shapes hardenable by heat into strong tough structures.

4. Moldable and heat-hardenable abrasive mixture comprising dried abrasive grains coated with a coating comprising a dispersion in liquid of non-sticky synthetic heat-hardening resinous reaction product of a phenol, an oil, and a methylene-containing agent from which the liquid has been sufficiently removed to render the mass non-sticky in the absence of pressure but capable of being shaped under compression into coherent shapes hardenable by heat into strong tough structures.

RUPERT S. DANIELS.